May 6, 1930. W. R. PERRY 1,757,734
SYNCHRONOUS VARIABLE SPEED ELECTRIC MACHINE DRIVE
Filed June 4, 1928
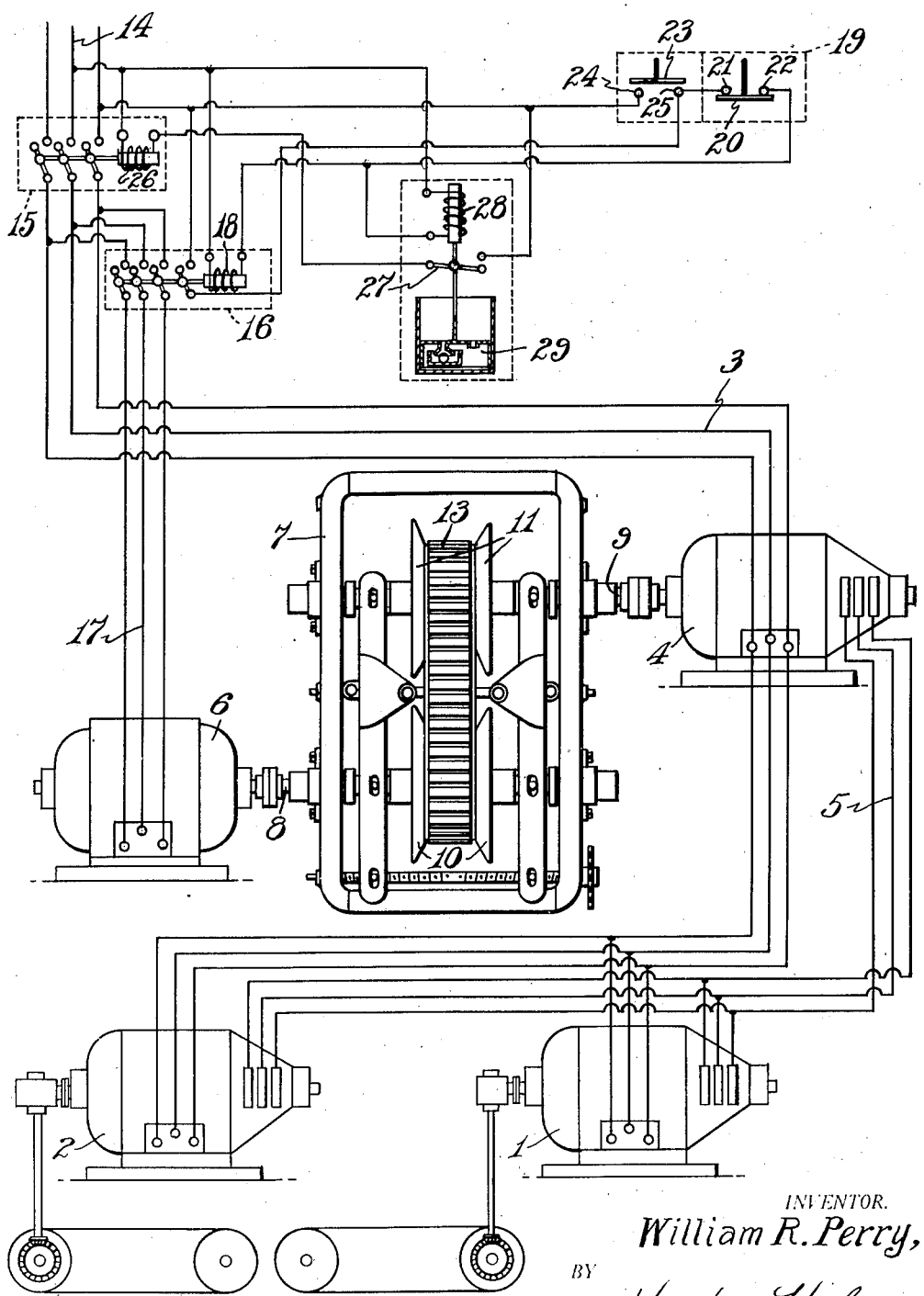
INVENTOR.
William R. Perry,
BY
Hood + Hahn
ATTORNEYS Patented May 6, 1930

1,757,734

UNITED STATES PATENT OFFICE

WILLIAM R. PERRY, OF COLUMBUS, INDIANA, ASSIGNOR TO REEVES PULLEY COMPANY, OF COLUMBUS, INDIANA, A CORPORATION OF INDIANA

SYNCHRONOUS VARIABLE-SPEED ELECTRIC MACHINE DRIVE

Application filed June 4, 1928. Serial No. 282,527.

My invention relates to improvements in means for controlling the operation of a plurality of electric motors in such a manner that all of said motors will operate synchronously as to speed.

My invention is particularly applicable to the control of a plurality of electric motors, each of which is adapted to drive a separate conveyor section so that each section will be driven at the same speed as the remaining sections.

For the purpose of disclosing my invention I have illustrated an embodiment thereof in the accompanying drawings in which the figure is a diagrammatic view, showing the relation of the various motors and control.

In the embodiment illustrated, I provide a plurality of motors in the slip ring alternating current type 1 and 2. It is obvious that more of these motors may be provided if desired. The primary windings of these motors are connected in parallel on the three phase line 3 on which is also connected the primary winding of an induction frequency changer 4 which, in actual practice, may be a slip ring alternating current motor of a power capacity equal to or greater than the sum of the power capacities of the motors 1 and 2. The slip rings of the secondary windings of the motors 1 and 2 and the induction frequency changer 4 are all connected in parallel by a suitable three phase circuit 5. The rotor of the induction frequency changer 4 is positively driven in a direction opposite to that of the rotation of the magnetic field in the primary thereof by a suitable driving motor 6 which may be of the ordinary squirrel cage type and rotates at a constant speed. Interposed between the motor 6 and the frequency changer 4 is a variable speed transmission 7. This transmission may be of that type known as the "Reeves" transmission wherein the driving force is delivered from the driving shaft 8 to the driven shaft 9 through the medium of two pairs of cone pulleys 10 and 11 and an intermediate driving belt 13 effective along its edge.

The axial movement of the pulleys toward or away from one another is depended upon for controlling the speed at which the driven shaft 9 is operated. By the interposition of this transmission the speed at which the rotor of the induction frequency changer 4 is rotated may be controlled to a nicety.

The current to the primaries of the induction frequency changer and of the motors to be controlled is supplied from the alternating current three phase line 14 to the supply line 3 through a magnetically operated switch 15 and from the supply line 3 through the magnetically operated switch 16 by the circuit 17 to the squirrel cage motor 6.

It is necessary in this type of arrangement that the circuit through the frequency changer and controlled motors remain closed until after the parts have come to rest as otherwise, if the circuit is opened before the parts have come to rest the motors and controller, due to coasting, will get out of step and therefore it would be impossible to again start the same. I have therefore provided a control whereby the circuit of the stator windings of the frequency changer and controlled motors is maintained closed for a sufficient period of time after the circuit through the driving motor 6 is opened to permit all of the parts to come to rest. The solenoid winding 18 of the switch is controlled from a double switch 19, this switch being provided with a stop contact 20 bridging stationary contacts 21 and 22 and a start contact 23 bridging the stationary contacts 24 and 25, the two contacts 23 and 20 being of the ordinary spring return push button type so arranged that 20 is normally in contact with 21 and 22 and 23 is normally out of contact with 24 and 25.

The solenoid winding 26 of the switch 15 is controlled by a solenoid operated switch 27 operated by a solenoid 28 and controlled by a dash pot 29, this dash pot being so arranged that it will permit the instant closing of the switch 27 when the solenoid winding 28 is energized but will delay the opening of the switch 27 until after the motor 6 has had opportunity to come to rest. In other words, the timed relation between the opening of the switch 16 by opening switch 20 and the opening of the switch 15 as a result of the delayed action of switch 27 under the influence of the dash pot is such that the switch 27 will remain closed until the motor 6 has had time to come to complete rest. The circuit through the solenoid 28 is controlled through the start and stop switches 20 and 23.

In operation, when the start switch 23 is depressed circuit will be established through the winding 18 of the switch 16, it being remembered that the stop switch 20 is in closed position and at the same time circuit will be established through the winding 28 of the switch 27 which, closing the switch 27 also closes the circuit through the winding 26 of the switch 15 causing that switch to close. The primary motor 6 is started and at the same time energizing field current is supplied to the primaries of the frequency changer 4 and the controlled motors 1 and 2 so that those motors will start and as long as supplied with current will operate in synchronism. By means of the variable speed transmission the speed of the frequency changer may be varied which in turn will vary the speed of the controlled motors.

When it is desired to stop the mechanism the stop switch 20 is opened thereby opening the circuit through the solenoid 18, permitting the switch 16 to open and also opening the circuit through the solenoid 28. However, due to the delay in action of the switch 27 by the dash pot this switch will not open until after sufficient time has elapsed for the motor 6 to come to rest, at which time the dash pot 29 will permit the switch 27 to open, thereby opening the circuit through the solenoid 26 of the switch 15 thus opening the supply circuit to the primaries of the frequency changer and controlled motors. The rotor of the frequency changer and of the controlled motors having come to rest while still electrically coupled through their fields they will remain in step and in condition for again starting.

I claim as my invention:

1. In a power system the combination with a plurality of induction machines having phase wound primaries and secondaries respectively electrically interconnected, a source of current supply for the primaries of said machines, means for driving the rotor of one of said machines in a direction opposite to the rotary magnetic field in the primary thereof, a switch for controlling a supply of current to the primaries of all of said machines and means insuring delay of the opening of said switch until after the said machines have stopped.

2. In a power system the combination with a plurality of induction machines having phase wound primaries and secondaries respectively electrically interconnected, of a source of electric supply for the primaries of said machines, a driving motor connected to the rotor of one of said machines and adapted to drive said rotor in a direction opposite to the rotating magnetic field thereof, a switch controlling said driving motor, a switch controlling the source of supply to said machines and means insuring a timed interval between the opening of said driving motor control switch and said supply switch whereby the driving motor may come to rest before said supply switch is opened.

3. In a power system the combination with a plurality of induction machines having phase wound primaries and secondaries respectively electrically interconnected, of a source of electrical supply for the primaries of said machines, a constant speed driving motor for driving the rotor of one of said machines in a direction opposite the rotating magnetic field thereof, a variable speed transmission interposed between said driving motor and said driven rotor, and means insuring delay of the discontinuance of electrical supply to said machines until after discontinuance of application of driving force by the motor.

4. In a power system, the combination with a plurality of induction machines having phase-wound primaries and secondaries and having their rotors electrically interconnected, a source of current supply for the primaries of said machines, means for driving the rotor of one of said machines in a direction opposite to the rotary magnetic field in the primary thereof, a switch for controlling a supply of current to the primaries of all of said machines, and means for insuring delay of the initiation of said driving means until establishment of connection between the current source and the primaries of said induction machines.

In witness whereof I, WILLIAM R. PERRY, have hereunto set my hand at Columbus, Indiana, this 31st day of May, A. D. one thousand nine hundred and twenty-eight.

WILLIAM R. PERRY.